United States Patent [19]

Bostic

[11] 3,875,387

[45] Apr. 1, 1975

[54] MAGNETIC OPERATIONS MONITOR

[76] Inventor: Michael E. Bostic, 85 E. Henrietta Rd., Rochester, N.Y. 14620

[22] Filed: Mar. 21, 1974

[21] Appl. No.: 453,233

Related U.S. Application Data

[62] Division of Ser. No. 256,659, May 25, 1972.

[52] U.S. Cl.............. 235/92 SB, 235/92 R, 355/14, 360/6
[51] Int. Cl............................................. B41l 39/02
[58] Field of Search........ 235/92 SB, 92 PD, 92 PK, 235/98 A; 355/14; 360/6; 346/33 M

[56] References Cited
UNITED STATES PATENTS 3,229,300  1/1966  Thompson et al. .............. 346/33 M
3,487,306  12/1969  Harmer............................... 324/47
3,758,755  9/1973  Sames ............................ 235/92 SB

*Primary Examiner*—Gareth D. Shaw
*Assistant Examiner*—Joseph M. Thesz, Jr.

[57] ABSTRACT

A magnetics operation monitor employing a sensor adapted to sense the presence of a changing electromagnetic field for producing an electrical signal. The electrical signal is coupled to an adaptor unit which provides a triggering pulse to a driver, which in turn provides a fixed duration pulse. The fixed duration pulse is coupled to a gating unit which in turn couples a recording signal source for the duration of the gating signal to a transcription device such as a tape recorder or the like.

2 Claims, 3 Drawing Figures

MAGNETIC OPERATIONS MONITOR

This is a division, of application Ser. No. 256,659, filed May 25, 1972.

MAGNETIC OPERATION MONITOR

This invention relates to operational monitoring devices and more particularly to a magnetic operations monitor.

In many operations there is a need and desire to provide a sensing circuit for indicating the status of an operation. For example in the area of document reproduction it is often necessary to provide some means for monitoring copy run lengths, various switching operations, billing or counting operations, and other sequential stages occurring during the course of operation of such machine or like devices.

Prior art devices for accomplishing the foregoing functions have often employed mechanical sensing devices such as brush, feeler, roller or other types of contacting mechanisms. Such devices often require specific design for a predetermined operation and are not capable of performing monitoring of more than the one operation for which they have been designed. Other types of prior art devices employ photo-optic sensing. Such photo-optic sensing devices are conventionally designed to operate by means of the optical energy generated by a device activated by the particular function being monitored. Such devices are often subject to error due ambient light conditions and the like.

Each of the foregoing devices suffers from the disadvantage that a specific connection is required to be made to the machine which is performing the operation to be monitored. Furthermore, such prior devices which do require direct connection to the machine usually require installation by means of qualified technical personnel, thereby making installation of such a device on a completed machine inconvenient.

In addition to monitoring the operation of a particular machine function, it is often desirable to have a permanent record of such operation monitoring. The most convenient form of permanent record is a transcription on a suitable transcription medium such as a magnetic tape of the like which can respond to the operation of a monitoring device in a manner suitable for enabling signals indicative of the monitoring operation to be transcribed onto the transcription medium. The transcription medium could then be later utilized, as by playback or the like, for data analysis or printout.

It is therefore a principal object of the present invention to provide an operations monitoring device which does not require complex electrical interconnections with the operation function being monitored.

It is a further object of the present invention to provide a single design for an operation monitoring device which may be utilized to monitor a plurality of operational devices.

It is a still further object of the present invention to provide an operations monitor which may be installed onto a machine with respect to an operation to be monitored in such a manner as to not interfere with any machine operation or function.

It is another object of the present invention to provide an operations monitor which will function to monitor a desired operation and to provide a transcribable output signal.

The foregoing objects are accomplished by virtue of the recognition that a large number of machine functions which are monitored employ the use of some means or mode of generating an electromagnetic field during operation. In reproduction equipment, for example, functions producing copy or billing counting employ electromagnetically actuated meters, whereas devices for effecting paper feeding conventionally employ solenoids, relays transformers and the like, etc. Each employ a form of switching which provides the presence of an electromagnetic field undergoing a variation in accordance with the switching taking place. The present invention therefore employs the concept of inductive coupling, through a sensor device, of the electromagnetic field generated by the operational device whose function is to be monitored. The sensor generates, as a result of the inductive coupling, a low level electrical signal. The signal is coupled to a processing device which responds to the low level signal for providing a gated record signal which is in turn coupled to a transcription device such as a magnetic tape recorder. In further detail, the processing device employs an adapter circuit for providing a trigger signal in response to the input from the sensor, which trigger signal is in turn coupled to a driving device which generates a fixed duration pulse. A gating circuit responds to the fixed duration pulse for coupling through a record signal source for the duration of said gating signal to the transcription device.

The foregoing objects and brief description of the present invention will become more apparent from the following more detailed description of the present invention and the drawings appended thereto, wherein.

Figure 1:
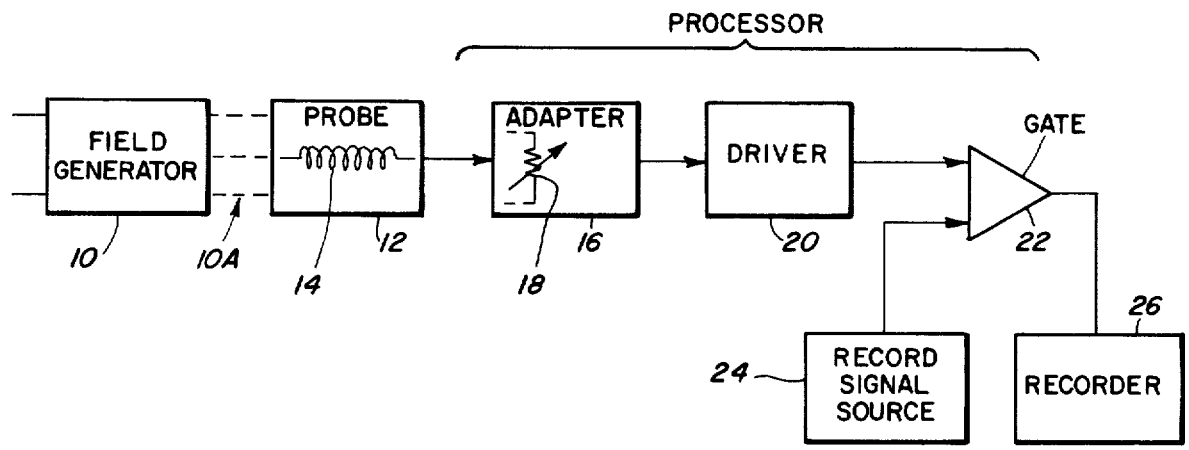
FIG. 1 is a general block diagram of the operation of the present invention.

The monitoring of a magnetic operation is effected within the concept of the present invention by means of a sensor adapted to sense the presence of an electromagnetic field produced by an electromagnetic field generating device performing the function to be monitored. Thus, as shown in FIG. 1, an electromagnetic field generating device 10 is shown which forms part of a machine operation, such a solenoid for effecting a paper feed operation, a switching relay, a transformer, a counting meter, or like device. In addition to performing a function, therefore, the device 10 further provides an electromagnetic field 10A in response to the operation being performed. This field is inductively coupled to a sensor device 12 which may be in the form of an inductive probe formed by a coil arrangement 14 which is physically positioned adjacent to the generating device in a manner sufficient to provide an electrical output from the probe 12 in response to a variation in the electromagnetic field generation of the device 10. The electrical signal is coupled from the probe 12 to an adapter 16 which as shown may include an adjustable sensitivity or gain control 18. The output of the adapter unit 16 is coupled to a driver unit 20 which is in turn coupled to the input of a gate 22. To a further input of the gate 22 is coupled a record signal source 24 which may be a source of signals suitable for transcription on a transcription device 26.

In operation, the electrical signal provided by the probe 12 is converted by the adapter 16 into a form suitable for triggering the driver unit 20. As a result, the driver unit 20 provides a pulse signal to the gate 22 of a duration sufficient to allow a signal from the source 24 to be transcribed onto the recorder 26. Thus, each event causing a variation in the electromagnetic field generated by the unit 10 results in signals from the source 24 to be passed to the transcription device 26 for a duration dependent upon the pulse width provided by the driver 20. In preferred embodiment, the transcription device 26 may comprise a magnetic tape transcription unit, of either a reel to reel or preferably cassette variety.

During the record operation, the recorder 26 may be operating at a standard cassette speed, for example, 1⅞ inches per second. The signal provided by the source 24 to the transcription device 26 each time an electromagnetic field generating event occurs is thus placed on the tape at the indicated rate. Upon completion of the monitoring operation, the tape can be played back at a higher speed into a translating device for subsequent processing by a computer for purposes of analysis or printout as desired.

Figure 2:
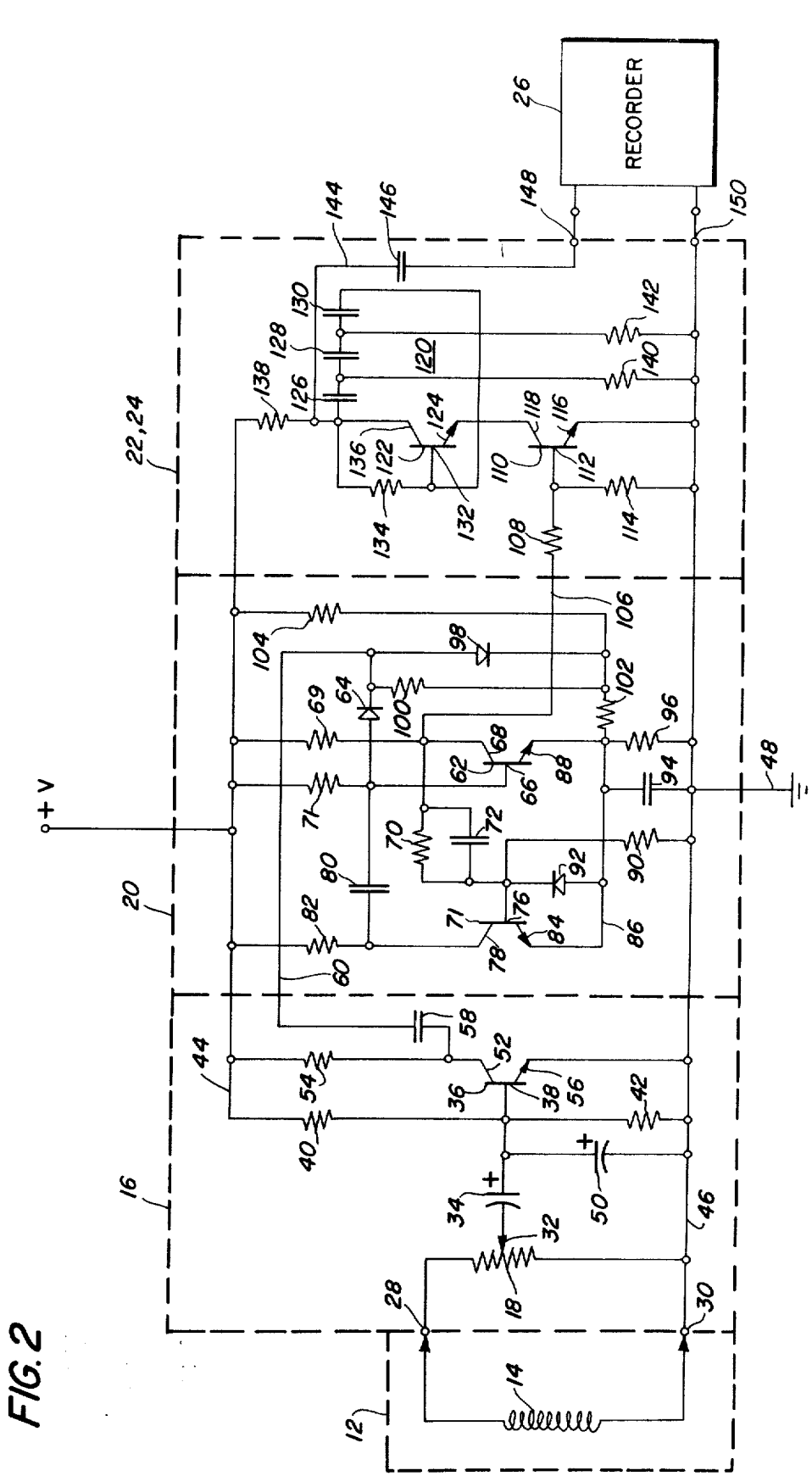
FIG. 2 is a circuit diagram showing in more detail the interrelationship between the functions described in the block diagram of FIG. 1.

Referring now to FIG. 2, a circuit diagram illustrating in greater detail the operation of the various blocks described in FIG. 1 is shown. Thus, as shown in FIG. 2 the probe 12 consists of a coil 14 containing a plurality of windings sufficient for sensing the presence of an electromagnetic field produced by a field generating device 10 as illustrated in FIG. 1. It is noted that although only one probe unit 12 is shown, it is possible to monitor multiple operations by means of multiple probe units all interconnected to the same input point. The probe is physically positioned in proximity with an electromagnetic force generating device 10 and may thus have a shape allowing the physical proximity to be most conveniently realized. For example, the probe may be elongated and flat in configuration, analogous to a telephone pickup coil, or the probe may be round, tubular or the like. The output of the coil 14 is coupled to a set of input terminals 28 and 30 which define the input points of the adapter unit 16. As was more generally illustrated in FIG. 1, a voltage dividing control 18 serves as an attenuating, sensitivity or gain control and is shown in FIG. 2 as a variable resistor connected across the terminals 28 and 30 with an adjustable center tap 32 which may be varied as by means of a dial, shaft, screw driver adjustment and the like, and which in turn couples the desired proportional input signal through an input capacitor 34 to an NPN transistor 36 and more particularly to its base region 38. The transistor 36 includes base biasing resistors 40 and 42 coupled between a source of potential +V appearing along the common supply line 44 and a common reference line 46 which is shown as being coupled to a common chassis ground 48. A bypass capacitor 50 is coupled across biasing resistor 42. The transistor 36 further includes a collector 52 which is coupled through a collector load resistor 54 to a source of potential +V along the common supply line 44. The emitter 56 of the transistor 36 is connected directly to the common reference line 46. The output of the adapter unit 16 is taken from the collector 52 of the transistor 36 through a capacitor 58 along the output line 60.

As is shown in FIG. 1, the output of the adapter 16 is coupled in turn to the driver 20. As illustrated in FIG. 2, the output line 60 of the adapter 16 is coupled to the driver 20, which is, in this embodiment, illustrated as a circuit arrangement forming a monostable multivibrator. Specifically, the output line 60 is coupled to a first NPN transistor 62 through a diode 64, and more specifically to the base 66 of the transistor 62. The collector 68 of the transistor 62 is coupled through an RC circuit, consisting of a resistor 70 and a capacitor 72 connected in parallel, to a second NPN transistor 74 and more specifically to the base 76 of the transistor 74. The transistor 74 includes a collector 78 which is in turn coupled through a timing and feedback capacitor 80 back to the base 66 of the transistor 62. The collector 78 is coupled by a collector load resistor 82 to the common supply line 44. The emitter 84 of the transistor 74 is connected along a conductor 86 to the emitter 88 of the transistor 62. Transistor 62 further includes a collector load resistor 69 coupling collector 68 to the common supply line 44, and a biasing and timing resistor 71 coupling the common supply line 44 to the base 66, diode 64 and capacitor 80. Biasing is supplied for the transistor 74 by means of a biasing resistor 90 coupled to the base 76 to the transistor 74. A diode 92 is connected between the base 76 of the transistor 74 and the conductor 86 with a poling opposite to that of the transistor 74, for aiding stability of the circuit as well as protecting the base 76 from negative going spikes, transients, etc. A bypass capacitor 94 intercouples the conductor 86 to the common reference line 46, across a resistor 96. The input line 60 is further coupled to a clamping diode 98 across which is connected a resistor 100, the latter resistor together with capacitor 58 forming a differentiating circuit. The parallel connection of diode 98 and resistor 100 is further connected through a resistor 102 to the conductor 86. The resistors 104 and 102 form a potential divider together with resistance 96, the series string of resistors 96, 102 and 104 being connected between the common supply line 44 and the common reference line 46. The output of the monostable multivibrator appears along the line 106 and is applied to the gating device 22, shown in FIG. 3 as combined with the record signal source 24, as will be explained further below.

The gating device 22 includes an input resistor 108 which is coupled in turn to an NPN transistor 110 and more specifically to the base electrode 112 of the transistor 110. A base biasing resistor 114 intercouples the base 112 to the common reference line 46. The emitter 116 is coupled directly to the common reference line 46. The collector 118 of the transistor 110 is coupled to a record signal source 24, illustrated generally as a phase shift oscillator 120 and which includes an NPN transistor 122 having its emitter 124 coupled to the collector 118 of the transistor 110. The transistor 122 is connected as an active element of a positive feedback loop including a phase shift network of capacitors 126, 128 and 130, and resistors 140 and 142, providing 180° phase shift feedback to the base 132 of the transistor 122. The value of the capacitors and resistors determine the oscillatory frequency. A biasing resistor 134 interconnects the collector 136 of the transistor 122 to the base 132 of the transistor 122. A collector load resistor 138 interconnects the source of potential applied along the common supply line 44 to the collector 136 of the transistor 122. The output of the oscillator circuit 120 is fed along the output line 144 from the collector 136 of the transistor 122 through output capacitor 146 to an output terminal 148. The output terminals 148 and 150 define the output of the gate 22 and record signal source 24 which is in turn applied to the recorder 26.

The operation of the circuit of FIG. 2 will now be described with reference to the timing waveform diagram illustrated in FIG. 3.

Figure 3:
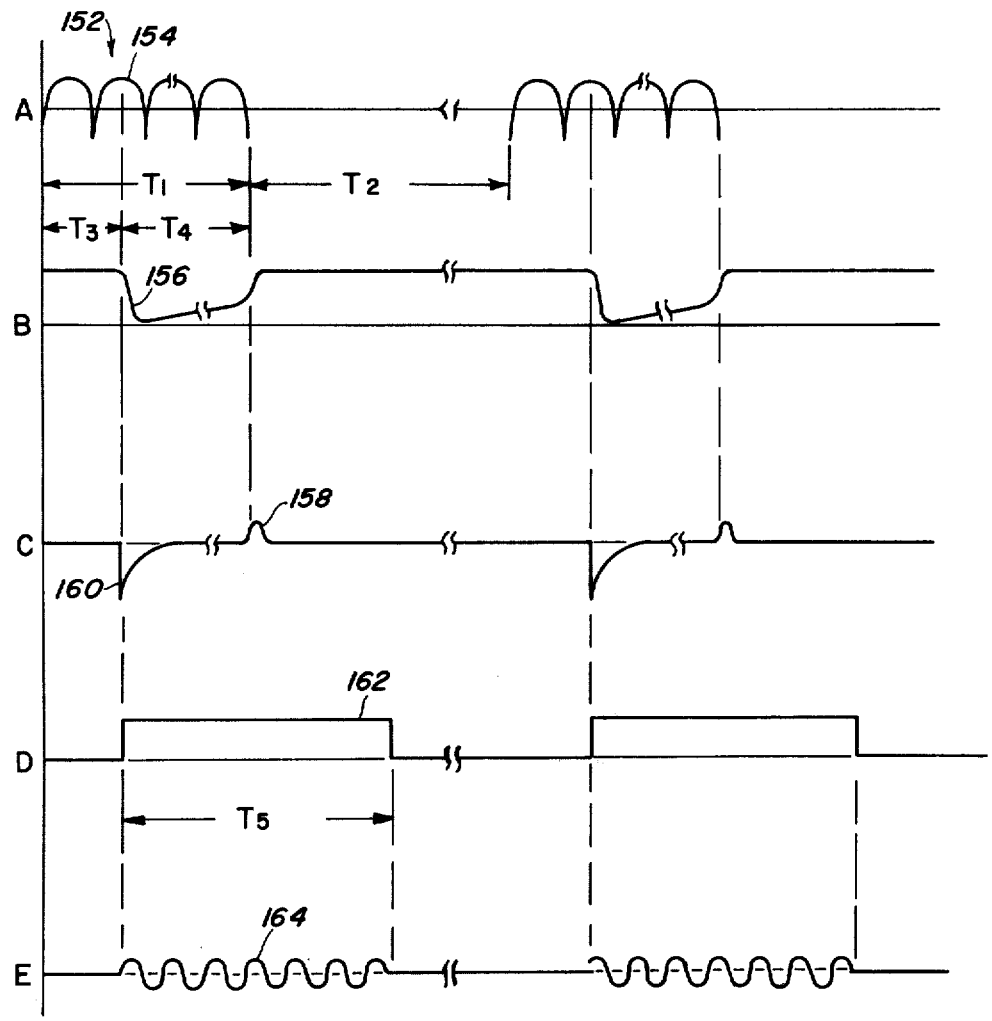
FIG. 3 is a waveform diagram illustrating the functional interrelationship of the circuit component shown in FIG. 2.

For purposes of this explanation, it will be assumed that the electromagnetic field generated by the unit 10 results in relatively low level electrical wave form produced by the coil 14 as a result of the inductive coupling between units 10 and 12, illustrated as wave form A of FIG. 3, representing the voltage at terminal 28 in FIG. 2.

As shown therein, the electrical signal 152 of wave form A, FIG. 3, is a burst of full wave rectified a.c. pulses with a swing of, for example, one volt. This is a typical form of generated electromagnetic field impulses provided in a typical magnetic operation. By way of example, the field sensed is that a solenoid or like device, operable on a full wave rectified 60 Hz wave form, over a one second switching period cycle of 150 ms on and 850 ms off. Thus, the on period $T_1$ would be of 150 ms duration, the off period $T_2$ of 850 ms duration, and the signal 154 would consist of full wave rectified 60 Hz signal, or pulse peaks 154 occurring every 8¼ ms.

The bypass capacitor 50 provides a filtering and thus a slight time delay effect such that one or two peaks 154 of initial electrical signal 152 will pass until, at time $T_3$, the voltage level on the capacitor 50 is sufficient to provide a potential swing at the collector 52 of the transistor 36. The delay effect serves to prevent transient noise conditions from activating the adapter unit 16. The wave form B of FIG. 3 shows the voltage levels at the collector 52 of the transistor 36 during this period. The transistor 36 in this example is normally biased in an active region such that an effective amplification is achieved therein. It is noted that transistor 36 could also be employed as a gating switch by readjusting the biasing levels.

Upon achieving the state defined by the potential swing 156, wave form B of FIG. 3, the collector 52 of the transistor 36 exhibits a degree of ripple over the time period $T_4$, the remaining on time, until the end of $T_1$, whereupon the collector 52 level returns to its initial point. The negative going swing 156 is coupled to the monostable multivibrator through a differentiator formed by the resistor 100 and the capacitor 58, thereby providing a negative going potential swing, along output line 60 as shown by the wave form C of FIG. 3. The slight positive excursion 158 caused by the ending of the on signal at the end of $T_1$, as shown on wave form C, is clamped by the action of the clamping diode 98. Thus, the output of the adapter unit 16 is a series of negative going pulses 160 corresponding to on periods of the device as appearing at the input terminal 28 from the probe units 12.

The negative going pulses 160 appearing from the output of the adapter unit 16 along the line 60 are coupled to a monostable multivibrator formed by transistors 62 and 74. This monostable multivibrator, operating in conventional manner, is triggered on by the negative going pulse 160 appearing along line 60 in a manner whereby the normally conductive transistor 62 is rendered nonconductive for a period of time determined by the periodicity of the monostable multivibrator which is controllable by a predetermined time constant in a well known manner. The nonconductivity of the transistor 62 is maintained for such period of time, and results in a voltage pulse 162 appearing along the output line 106 with the wave form C of FIG. 3. At the end of this time period, $T_5$, the multivibrator automatically resets. The voltage pulse 162 appearing along the line 106 is next coupled to the base 112 of the gating transistor 110, thereby resulting in the transistor 110 becoming conductive for a time duration defined by the window created by the duration of the pulse 162. Conductivity of the transistor 110 will result in providing a current path for the transistor 122 by grounding the emitter of the transistor 124, thereby rendering the oscillator 120 effective. The components in the oscillator 120 for purposes of illustration are designed to provide an audio frequency 164, shown in wave form E of FIG. 3, which may be for example of a frequency of 1,000 Hz. The oscillatory energy 164 of the oscillator 120 will be applied along the output line 144 through the capacitor 146 to the terminal 148 on the recorder 26 for a period of time, $T_5$, determined by the window created by the pulse 162. The transistor 110 thus acts as a gating device in that it renders the energy applied by the oscillator 120 effective only for a period of time determined by the duration of conductivity of the transistor 110, in turn determined by the output pulse 160 appearing on line 106.

The use of NPN transistors is exemplary only. Obviously, PNP or combinations of types may be employed within the skill of the art.

It should be noted that the duration $T_5$ of the window created by the pulse 160 of the driving unit 20 should be of a duration longer than the duration $T_1$ of the signal provided by the probe unit 12, but terminate prior to the beginning of the next $T_1$ cycle, or during $T_2$. By way of example, in this embodiment, a duration $T_5$ of 500 ms may be employed. By way of aiding in this description but in no way intending to be limiting, the following component values may be employed where component subscripts apply to legends employed:

| | |
|---|---|
| C50 | 1 mf |
| R42 | 47K ohms |
| R40 | 220K ohms |
| R54 | 2.2K ohms |
| C58 | .05 mf |
| R82 | 1K ohms |
| C80 | 1 mf |
| R70 | 220K |
| C72 | 10 pf |
| R90 | 560K ohms |
| C94 | .05 mf |
| R71 | 220K ohms |
| R69 | 1K ohm |
| R96 | 220 ohms |
| R102 | 3.3K ohms |
| R104 | 22K ohms |
| R100 | 33K ohms |
| R108 | 100K ohms |
| R114 | 10K ohms |
| T36, 74, 62, 110, 122 | 2N3391 |

Obviously, variations in the foregoing may be made by those skilled in the art without departing from the spirit or scope of the invention.

The foregoing embodiment has employed audio oscillation as the means whereby a permanent transcription corresponding to signals sent by the probe unit 12 may be applied to a transcription unit. It should be obvious to those skilled in the art that audio frequency signals are best transcribed at relatively high tape speeds. For low tape speeds, the audio oscillation may obviously be replaced by a digital source. Thus, for example, the leading edge of the pulse 160 supplied by the adapter unit 16 can be employed to trigger a bistable circuit such as a JK flip-flop having complementary outputs. By directly coupling the respective outputs of both sides of the flip-flop to both sides of a recording head, a complete flux reversal may be obtained with each successive leading edge of the pulse 160. Thus, the tape will be transcribed with a digital indication by means of induced flux reversals, one per set of input burst, caused by the magnetic head within the recorder unit 12, and thereby providing a digital indication of the switching characteristic of the machine function being monitored. In this example, the recording tape speed may be as low as from 0.003 to 0.005 inches per second. Play back to a computer or data printout may be at a much higher speed.

Other arrangements and variations for the foregoing system obviously be employed within the scope and concept of the present invention. Thus, a plurality of sensor units and a plurality of adapter, driver, gating and signal source units may be employed by means of multiplexing, switching or like arrangment which can result in a plurality of units monitoring functions in a time shared manner to a common recorder. Furthermore, although reproducing machines have been described as an area of utility, obviously utility may be expanded to monitor any operational device emitting an electromagnetic field during its course of operation. Also, although input signals in the form of a plurality of bursts of full wave rectified voltages are shown, it is apparent that the trigger pulse can be set up by any detectable form of input signal of a sufficient duration to establish the trigger pulse. Obviously, the input sensitivity of the adapter may be varied by additional stages of amplification and the like, and the response time of same similarly improved.

While this invention has been particularly shown and described with reference to an exemplary embodiment and variations thereof, it will be obvious to those skilled in the art that the foregoing examples as well as suggested alternatives and as well as other changes and modifications form and detail may be made without departing from the scope and spirit of the present invention.

What is claimed is:

1. A recorder for recording over a time interval events occurring in a copying or document reproduction machine, said machine having a component which when actuated reflects the occurrence of the event being recorded together with electromagnetic drive means for actuating said component, the combination of: a magnetic sensor adapted for disposition adjacent said drive means so as to produce an electrical signal in response to a magnetic variation in said drive means representing actuation of said machine component, first means for converting the electrical signal from said sensor to a gating signal, second means coupled to said first means and responsive to said gating signal for providing a recording signal representing actuation of said component, and recording means coupled to said second means for recording said recording signal.

2. The recorder of claim 1 in which said machine component comprises a counter for counting copies made.

* * * * *